United States Patent
Proksch et al.

(10) Patent No.: US 9,366,693 B2
(45) Date of Patent: Jun. 14, 2016

(54) VARIABLE DENSITY SCANNING

(71) Applicant: Oxford Instruments Asylum Research Corporation, Santa Barbara, CA (US)

(72) Inventors: Roger B Proksch, Santa Barbara, CA (US); Roger C Callahan, Goleta, CA (US)

(73) Assignees: Oxford Instruments PLC, Oxfordshire (GB); Oxford Instruments AFM Inc, Pleasanton, CA (US)

( * ) Notice: Subject to any disclaimer, the term of this patent is extended or adjusted under 35 U.S.C. 154(b) by 0 days.

(21) Appl. No.: 14/755,273

(22) Filed: Jun. 30, 2015

(65) Prior Publication Data

US 2015/0377920 A1 Dec. 31, 2015

Related U.S. Application Data (63) Continuation of application No. 13/943,023, filed on Jul. 16, 2013, now abandoned, which is a continuation of application No. 13/104,189, filed on May 10, 2011, now Pat. No. 8,489,356, which is a continuation of application No. 11/563,822, filed on Nov. 28, 2006, now Pat. No. 7,941,286.

(60) Provisional application No. 60/763,659, filed on Jan. 31, 2006.

(51) Int. Cl.
*G01Q 10/00* (2010.01)
*G01Q 10/06* (2010.01)

(52) U.S. Cl.
CPC .............. *G01Q 10/00* (2013.01); *G01Q 10/06* (2013.01)

(58) Field of Classification Search
USPC ........................................................... 850/1
See application file for complete search history.

(56) References Cited

U.S. PATENT DOCUMENTS

| | | | |
|---|---|---|---|
| 4,952,857 A | 8/1990 | West et al. | |
| 5,138,158 A | 8/1992 | Ninomiya et al. | |
| 5,204,531 A * | 4/1993 | Elings .................... | B82Y 35/00 250/307 |
| 6,297,503 B1 | 10/2001 | Bindell et al. | |
| 6,510,730 B1 | 1/2003 | Phan et al. | |
| 6,546,788 B2 | 4/2003 | Magerle | |
| 6,612,160 B2 | 9/2003 | Massie et al. | |
| 6,661,004 B2 | 12/2003 | Aumond et al. | |
| 6,671,973 B2 | 1/2004 | Takemura et al. | |
| 6,815,677 B2 | 11/2004 | Nagai et al. | |
| 7,406,860 B2 | 8/2008 | Zhou et al. | |
| 7,421,370 B2 | 9/2008 | Jain et al. | |
| 7,941,286 B2 | 5/2011 | Proksch et al. | |
| 2002/0105867 A1 | 8/2002 | Tamaru et al. | |
| 2007/0251306 A1 | 11/2007 | Zhou et al. | |
| 2008/0052458 A1 | 2/2008 | Micheloni et al. | |
| 2008/0276696 A1 | 11/2008 | Zhou et al. | |
| 2009/0325087 A1 | 12/2009 | Lyons | |
| 2012/0042422 A1* | 2/2012 | Zhou ...................... | B82Y 35/00 850/1 |

OTHER PUBLICATIONS

International Search report and Written Opinion for International application No. PCT/US06/61410, mailed Feb. 7, 2008.

* cited by examiner

*Primary Examiner* — Phillip A Johnston
(74) *Attorney, Agent, or Firm* — Law Office of Scott C Harris, Inc (57) ABSTRACT

Systems and techniques for varying a scan rate in a measurement instrument. The techniques may be used in scanning probe instruments, including atomic force microscopes (AFMs) and other scanning probe microscopes, as well as profilometers and confocal optical microscopes. This allows the selective imaging of particular regions of a sample surface for accurate measurement of critical dimensions within a relatively small data acquisition time.

22 Claims, 8 Drawing Sheets

VARIABLE DENSITY SCANNING

CROSS-REFERENCE TO RELATED APPLICATIONS

This is a continuation application of Ser. No. 13/943,023, Filed Jul. 16, 2013, which is a continuation of Ser. No. 13/104,189 filed May 10, 2011, now U.S. Pat. No. 8,489,356 issued Jul. 16, 2013, which is a continuation application of Ser. No. 11/563,822, filed Nov. 28, 2006, now U.S. Pat. No. 7,941,286 issued May 10, 2011, which claims the benefit of priority of U.S. Provisional Patent Application Ser. No. 60/763,659, entitled Variable Density Scanning, filed on Jan. 31, 2006, each of which are hereby incorporated by reference in its entirety.

TECHNICAL FIELD

This invention generally relates to certain measurement instruments, including cantilever-based instruments and scanning probe instruments, such as atomic force microscopes (AFMs).

BACKGROUND

For the sake of convenience, the current description focuses primarily on systems and techniques that may be realized in a particular type of cantilever-based instrument: the AFM.

Cantilever-based instruments include such instruments as AFMs, molecular force probe instruments (1D or 3D), high-resolution profilometers (including mechanical stylus profilometers), surface modification instruments, chemical or biological sensing probes, and micro-actuated devices. The systems and techniques described herein may be realized in such other cantilever-based instruments and may also be used with other scanning probe instruments. For example, they may be used with scanning optical probes such as optical confocal microscopes.

An AFM is a device used to produce images of surface topography (and/or other sample characteristics) based on information obtained from scanning (e.g., rastering) a sharp probe on the end of a cantilever relative to the surface of the sample. Topographical and/or other features of the surface are detected by detecting changes in cantilever deflection and/or oscillation characteristics (e.g., by detecting small changes in deflection, phase, frequency, etc., and using feedback to return the system to a reference state). By scanning the probe relative to the sample, a "map" of the sample topography or other sample characteristics may be obtained.

Changes in deflection or in oscillation are typically detected by an optical lever arrangement whereby a light beam is directed onto a cantilever in the same reference frame as the optical lever. The beam reflected from the cantilever illuminates a position sensitive detector (PSD). As the deflection or oscillation of the cantilever changes, the position of the reflected spot on the PSD changes, causing a change in the output from the PSD. Changes in the deflection or oscillation of the cantilever are typically made to trigger a change in the vertical position of the cantilever base relative to the sample, in order to maintain the deflection or oscillation at a constant pre-set value. It is this feedback that is typically used to generate an AFM image.

AFMs can be operated in a number of different imaging modes, including contact mode where the tip of the cantilever is in constant contact with the sample surface, and oscillatory modes where the tip makes no contact or only intermittent contact with the surface.

Actuators are commonly used in AFMs, for example to raster the probe or to change the position of the cantilever base relative to the sample surface. The purpose of actuators is to provide relative movement between different parts of the AFM; for example, between the probe and the sample. For different purposes and different results, it may be useful to actuate the sample, the tip, or some combination of both. Sensors are also commonly used in AFMs. They are used to detect movement, position, or other attributes of various components of the AFM, including movement created by actuators.

For the purposes of the specification, unless otherwise specified, the term "actuator" refers to a broad array of devices that convert input signals into physical motion, including piezo activated flexures, piezo tubes, piezo stacks, blocks, bimorphs, unimorphs, linear motors, electrostrictive actuators, electrostatic motors, capacitive motors, voice coil actuators and magnetostrictive actuators. The term "position sensor" or "sensor" refers to a device that converts a physical parameter such as displacement, velocity or acceleration into one or more signals such as an electrical signal, including capacitive sensors, inductive sensors (including eddy current sensors), differential transformers (such as described in co-pending applications US20020175677A1 and US20040075428A1, Linear Variable Differential Transformers for High Precision Position Measurements, and US20040056653A1, Linear Variable Differential Transformer with Digital Electronics, which are hereby incorporated by reference in their entirety), variable reluctance, optical interferometry, optical deflection detectors (including those referred to above as a PSD and those described in co-pending applications US20030209060A1 and US20040079142A1, Apparatus and Method for Isolating and Measuring Movement in Metrology Apparatus, which are hereby incorporated by reference in their entirety), strain gages, piezo sensors, magnetostrictive and electrostrictive sensors.

SUMMARY

Systems and techniques provided herein allow for much more effective measurement of the topography of small surface features than is possible with currently available commercial tools. The techniques make judicious use of inspection time, where more time is devoted to regions of the sample where the highest spatial resolution is desired and less time in other regions where some information may be required, but with less precision or spatial resolution.

In one aspect, the current disclosure provides a novel cantilever-based instrument that permits more accurate imaging of sample features in a shorter period of time, in which the scan rate is variable over the field of a single acquired image.

In another aspect, the current disclosure provides a novel cantilever-based instrument that can acquire a single image which measures features with different sizes with a variable pixel density chosen to balance the competing requirements of high data density and short measurement time.

In another aspect, the current disclosure provides systems and techniques to reduce the amount of data acquired and saved by cantilever-based instruments performing metrology operations.

In general, in another aspect, the current disclosure provides a method comprising receiving information indicative of a position of a region of interest of a sample and generating a scan waveform including a first waveform segment configured to obtain a first data density in the region of interest of the sample and a second waveform segment configured to obtain a second data density less than the first data density outside the region of interest of the sample. The scan waveform may further comprise a third waveform segment configured to obtain a third different data density.

The method may further include scanning a measurement instrument relative to the sample using the scan waveform. Scanning the measurement instrument relative to the sample using the scan waveform may comprise scanning the measurement instrument along a fast scan axis. Scanning the measurement instrument along the fast scan axis may comprise using the first waveform segment to scan the measurement instrument along a first scan segment and using the second waveform segment to scan the measurement instrument along a second scan segment. The first scan segment and the second scan segment may be substantially linear.

The scanning waveform may further comprise a third waveform segment configured to obtain a third data density in the region of interest of the sample and a fourth waveform segment configured to obtain a fourth data density less than the third data density outside the region of interest of the sample. Scanning the measurement instrument relative to the sample using the scan waveform may further comprise scanning the measurement instrument along a slow scan axis, and scanning the measurement instrument along the slow scan axis may comprise using the third waveform segment to scan the measurement instrument along a third scan segment and using the fourth waveform segment to scan the measurement instrument along a fourth scan segment.

Scanning the measurement instrument relative to the sample using the scan waveform may comprise scanning the measurement instrument along a slow scan axis, and scanning the measurement instrument along the slow scan axis may comprise using the first waveform segment to scan the measurement instrument along a first scan segment and using the second waveform segment to scan the measurement instrument along a second scan segment. The measurement instrument may be an atomic force microscope.

In general, in another aspect, an apparatus comprises a measurement instrument including a portion configured to interact with a sample in operation, a sample holder configured to position the sample relative to the portion of the measurement instrument, and a controller configured to provide relative scanning between the measurement instrument and the sample holder. The controller may be configured to provide relative scanning in a first direction, and the relative scanning may include a first scan segment to obtain a first data density in a pre-determined sample region and a second scan segment to obtain a second different data density outside of the pre-determined sample region.

The controller may be configured to control the sample holder and/or to control the measurement instrument. The apparatus may further comprise a data element in communication with the controller, the data element including at least one of data and instruments to determine a scan waveform including the first scan segment and the second scan segment.

In general, in another aspect, the current disclosure provides an article comprising a machine-readable medium embodying information indicative of instructions that when performed by one or more machines result in operations comprising receiving information indicative of a region of interest of a sample, and determining a scan rate profile for relative scanning of a measurement instrument across the sample. The scan rate profile may include a first scan rate segment associated with the region of interest and a second scan rate segment associated with a region of the sample not included in the region of interest, wherein the first scan rate segment is configured to implement relative scanning at a denser rate than the second scan rate segment. The first scan rate segment may be configured to implement linear scanning. The operations may further comprise receiving measurement data indicative of one or more sample parameters for a scan using the scan rate profile. The operations may further comprise determining the one or more sample parameters using the measurement data and the scan rate profile.

In general, in another aspect, the current disclosure provides a method comprising implementing relative scanning of a portion of a measurement instrument with respect to a sample surface, wherein the sample surface includes a first region and a second region. Implementing relative scanning of the portion of the measurement instrument relative to the sample surface may include implementing relative scanning according to a waveform having a first higher data density segment associated with relative scanning of the first region and a second lower data density segment associated with relative scanning of the second region. The method may further comprise receiving information indicative of one or more sample characteristics for the first region and the second region based on the relative scanning of the portion of the measurement instrument with respect to the sample surface.

The sample surface may comprise a sample surface of a sample of a first sample type, and the first region may be a region of interest for the first sample type. The measurement instrument may comprise an atomic force microscope.

In general, in another aspect, the current disclosure provides a method comprising the receipt of information indicative of a relative position of a first region and a second different region for a particular sample type, and generating information indicative of a scan waveform including a first data density waveform portion and a second data density waveform portion. The scan waveform may be configured to obtain a first higher data density in the first region using the first data density waveform portion and to obtain a higher different data density in the second region using the second data density waveform portion.

The particular sample type may be a semiconductor device sample type, and the first region may be a particular region of a circuit included in a semiconductor device formed on a semiconductor substrate. The second region may be a reference region of the semiconductor substrate included in or separate from the circuit. The method may further comprise using the information indicative of the scan waveform in a scan of a sample having the sample type.

These and other features and advantages of the present invention will be more readily apparent from the detailed description of the exemplary implementations set forth below taken in conjunction with the accompanying drawings.

BRIEF DESCRIPTION OF THE DRAWINGS

Like reference symbols in the various drawings indicate like elements.

DETAILED DESCRIPTION

Accurate characterization of a sample by a scanning probe instrument such as an AFM is often limited by the ability of the AFM to move the base of the cantilever vertically in the Z direction relative to the sample surface at a rate sufficient to characterize the sample accurately while scanning horizontally (e.g., in either the X or Y direction). This movement rate is often expressed in terms of bandwidth. Typical commercial AFM bandwidths at present are on the order of a few kHz. This implies that, for example, completing a 256×256 pixel image requires a few minutes. This amount of time has typically precluded AFMs from becoming routine in-line inspection systems for industrial processes. This is especially true when they are competing with optical inspection tools that may be able to make a similar measurement in a fraction of a second.

However, as dimensions of components continue to shrink, critical dimension (CD) measurements in industrial process and other applications that were formerly accomplished with optical inspection systems are more difficult and, in some cases, no longer possible.

The dynamic range of CD measurements required is also increasing. For example, while the size of devices such as computer chips or magnetic recording heads ranges from .about.100 microns up to about a centimeter, the dimensions of the features of these devices need to be controlled on the order of a few atomic layers. This can require sub-angstrom standard deviations in CD measurements. Moving from 100 microns to 1 angstrom is a six order of magnitude range in measurement scales. This range puts strict performance criteria on the measurement apparatus. The actuator that is used to scan the cantilever relative to the sample over a 100 micron range is also required to position the probe with sub-nanometer accuracy and precision.

Some cantilever-based instruments that have been used for CD measurements of these sorts of features make use of open-loop piezo scanners. These scanners are subject to numerous limitations. Two of the most problematic are creep and hysteresis. Creep is the uncontrolled motion of the piezo actuator when the control signal is held stationary. Hysteresis is the label used to describe the unpredictable response of the piezo actuator that depends on both the control signal and where the actuator was originally positioned. Overcoming the creep and hysteresis that are intrinsic to piezo scanners has been the subject of an enormous body of research and development, principally centered on predictive modeling of piezo behavior and then linearizing the motion and correcting for creep with nonlinear and time dependent command voltages. Unfortunately, understanding the behavior of piezo materials has proven difficult. Worse yet, the behavior can change over time, necessitating that this change in behavior be predicted or, more likely, that the predictions themselves be changed from time-to-time when it is evident that the change in behavior has occurred.

Another method of overcoming creep and hysteresis is to provide sensors that directly measure the piezo position and then, through the use of a feedback loop, actively correct for any errors in the position. This general methodology is referred to as "closed loop" piezo control. This method puts much of the performance demand on the sensors. It is generally advantageous if the sensors are linear, operate over an extended dynamic range (.about 100 microns down to less than an angstrom) and be stable over time. Co-pending applications US20020175677A1, US20040075428A1 and US20040056653A1, which have been incorporated herein by reference, describe a low noise, linear differential transformer and signal conditioning that provides the performance necessary for these sorts of positioning requirements.

As mentioned above, another requirement for CD measurements is that the measurements be made rapidly. Older, high speed techniques based on optics are less and less suitable as the length scale of features drops below a few hundred nanometers. This presents manufacturers with a serious throughput problem. Unless new techniques can be made to function at speeds approaching those of optical techniques, use of these techniques may require testing at less frequent intervals in the manufacturing process.

Figure 1:
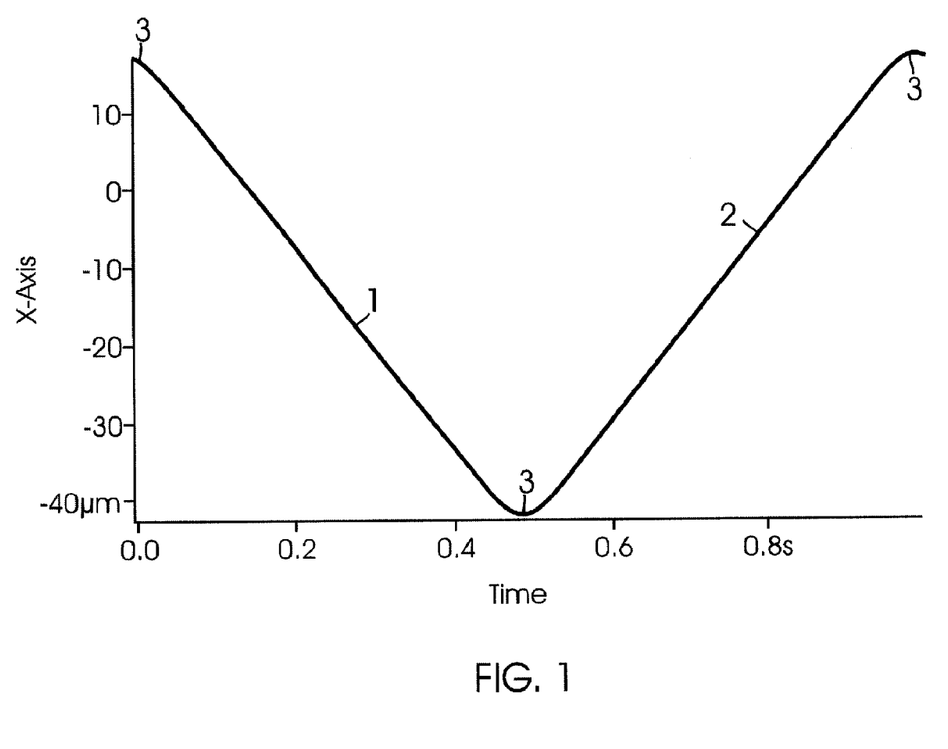
FIG. 1 shows a normal scan waveform for the fast axis of an AFM.

FIG. 1 is a typical scan waveform for an atomic force microscope. In this plot, the position of the scanner for the fast scan axis (the X-axis in this case) is shown. This waveform could result from nonlinear, open loop voltages being applied to the scanner, or preferably, from a closed loop methodology. As the scanner rasters back and forth, there are linear regions 1 in the trace and 2 in the retrace directions. These linear regions are separated by non-linear turn around regions 3 where the scanner changes direction. It is convenient for data processing to use data only from the linear regions in constructing an image.

Figure 2:
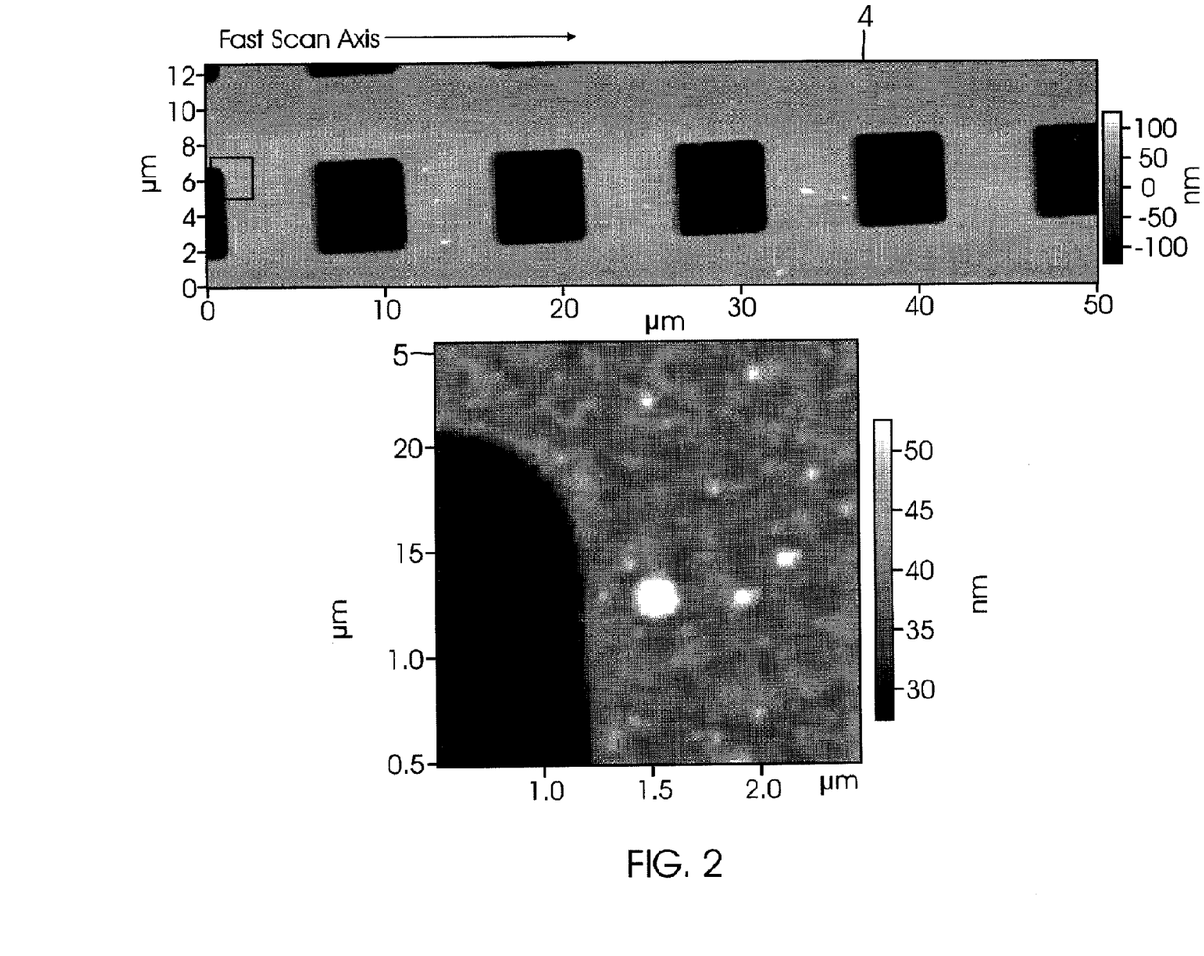
FIG. 2 is an image and software zoom of a two dimensional diffraction grating acquired with the normal fast-axis scan waveform shown in FIG. 1.

FIG. 2 shows an image 4 of a two dimensional diffraction grating which was acquired using the fast scan axis waveform of FIG. 1, as well as a software zoom 5 into a region of interest of the image. The image 4 measures 512×4096 pixels. The long axis was made at a scan range of 50 μm and the short at 12.5 μm. This yielded square pixels roughly 10 nm wide. At a scan rate of 2.5 Hz, it took roughly 3.5 minutes to acquire the image. The 10 nm resolution is apparent in the software zoom 5. This zoom is roughly 2 μm square and thus made up of 200×200 pixels.

It should be noted that the rectangular aspect ratio of image 4 in FIG. 2 represents one common way AFMs have reduced image acquisition time. By using non-square scanning, the acquired data more closely matches the area of interest on the device. Although this may provide some benefits, it may not be sufficient for some applications.

Systems and techniques provided herein allow for tuning the data acquisition density to the particular requirements of different measurements in the operation of measurement instruments (such as cantilever-based instruments), thereby improving the acquisition time, accuracy and precision of the measurement. Herein, "data density" refers to the amount of data acquired per sample surface unit (per relative probe-sample distance traversed, sampled surface area, or other appropriate sample surface measurement.)

Much current AFM research and development involves speeding up the measurement bandwidth of these cantilever-based instruments. The present disclosure, however, concerns using an AFM in a "smarter" manner. In accordance with embodiments of the invention, by tuning the data density to the particular measurement requirements, the acquisition time and, as it turns out, the accuracy and precision of the measurement can be greatly improved.

Moreover, the current systems and techniques provide for increased data density without increasing the data acquisition time, by using one or more scan waveforms with at least one high density waveform segment and at least one lower density waveform segment. Therefore, the current techniques may be used in environments in which existing techniques are not practical.

Referring again to the example of FIG. 2, the region depicted in the software zoom 5 might, for example, be particularly important for production tolerances. Higher data density for this region would be desirable. Rather than assessing each sample individually and designating particular regions as interesting, this region may be designated ahead of time as a region of interest for each sample of the sample type represented by FIG. 2.

Furthermore, the features in the other regions of the sample are not as critical. Though it is important to have some information about those regions, the point density can be much lower. In fact, in some existing systems, data from less interesting regions is obtained and then low-pass filtered, effectively throwing away information after it was acquired. This is a consequence of conventional scanning methods. For a given AFM mechanical bandwidth, the only way to get better data density in the region of interest using a conventional raster scan waveform is to slow the scan rate down and acquire more points over the entire image. This results in an undesirably long acquisition time and data files that are much larger than they need to be.

Figure 3:
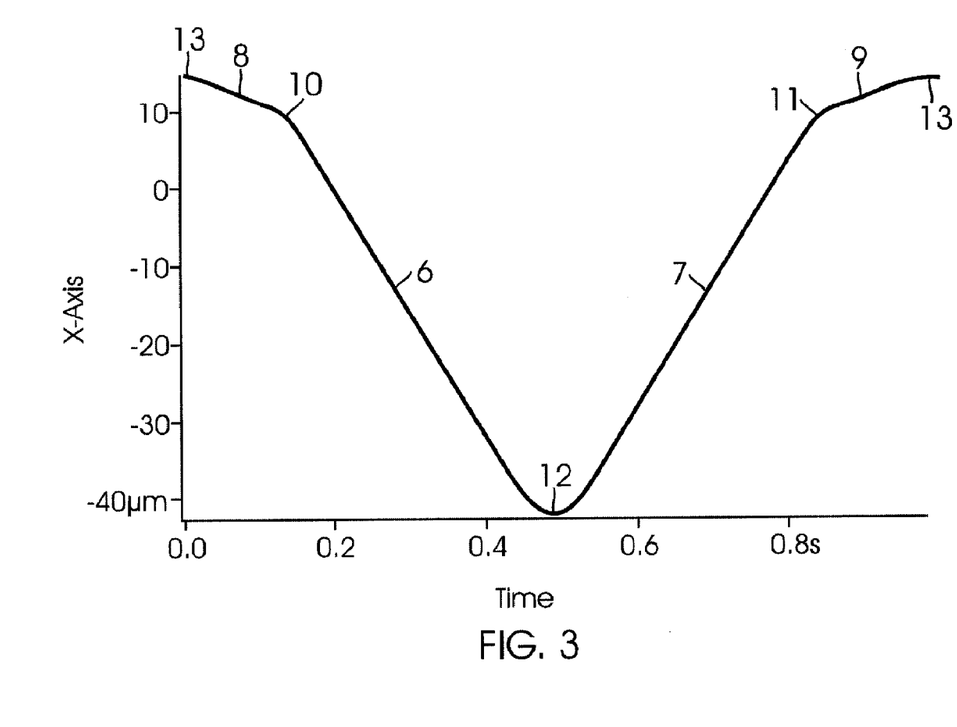
FIG. 3 is a dual density scan waveform for the fast axis of an AFM.

FIG. 3 shows a waveform according to one of the embodiments of the present invention. In this embodiment, there are two types of acquisition regions, low density trace 6 and retrace 7 regions and high density trace 8 and retrace 9 regions. These regions are separated by transition regions 10, 11 and 12. For ease of comparison, the total scan range of the curve shown in FIG. 3 is the same as that shown in FIG. 1. The illustrated scans, in fact, take the same amount of time (roughly 1 second). However, the probe now spends less time in the low density regions 6 and 7, and much more time in the high density regions 8 and 9.

Figure 4:
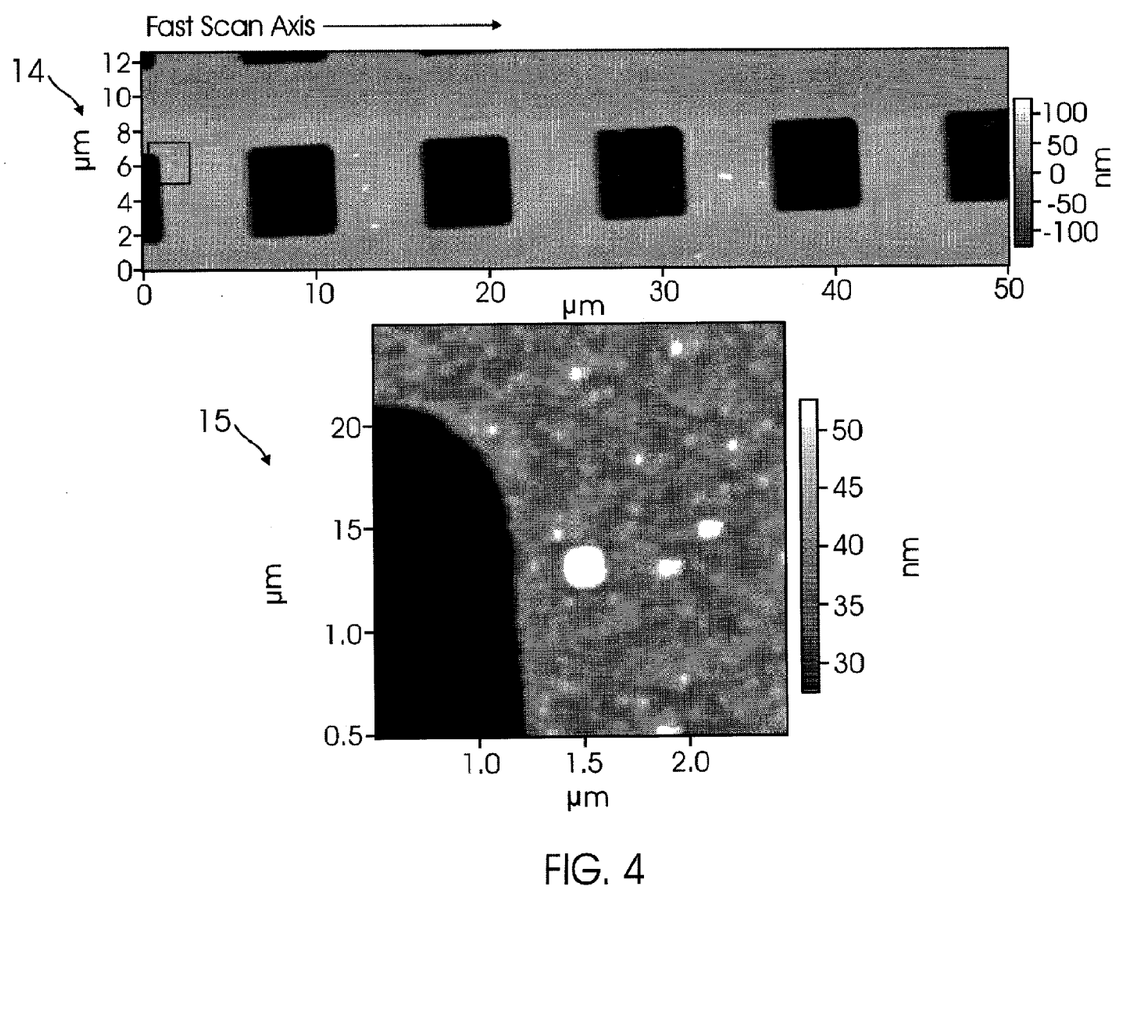
FIG. 4 is an image and software zoom of a two dimensional diffraction grating acquired using the dual density fast-axis scan waveform shown in FIG. 3.

FIG. 4 shows the results of this scan on the same diffraction grating pictured in FIG. 2. The 12.5 μm×50 μm image 14 of the grating looks quite similar to the image 4 of the same grating in FIG. 2. However, the pixels in 14 and the software zoom 15 are now no longer square, nor are they uniformly sized over the image. The software zoom 15 of FIG. 4 shows the resulting enhanced resolution over the region of interest, the same region shown in the software zoom 5 of FIG. 2.

Figure 5:
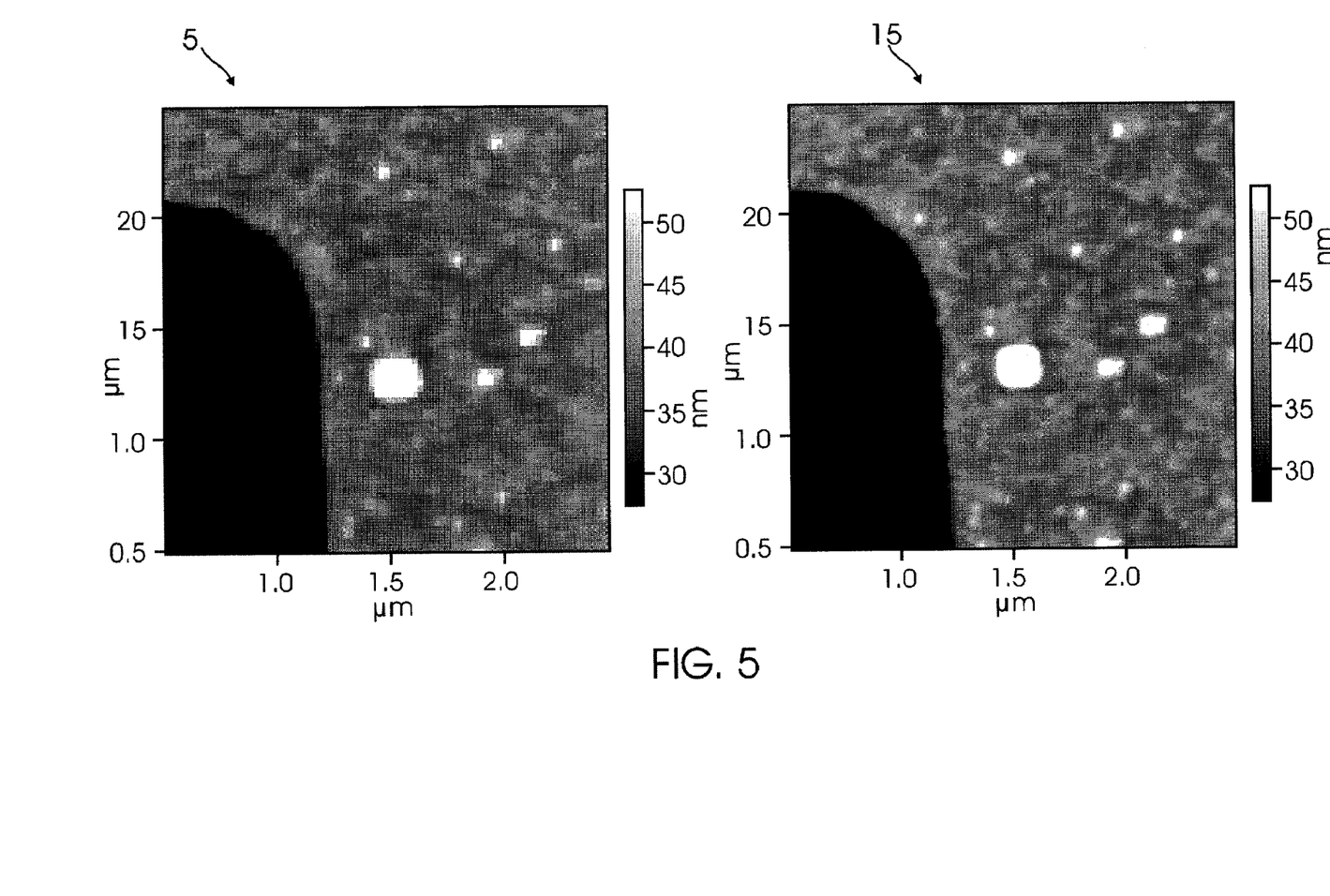
FIG. 5 is a side by side comparison of the software zooms using the normal and dual density scanning methods.

FIG. 5 shows a side by side comparison of the two software zoomed regions 5 and 15. The dual density scan 15 clearly shows more detail than the conventionally acquired image 5, even though the image acquisition times and file sizes for the two images are identical.

The embodiment of the present invention depicted in FIG. 3 and FIG. 4 shows a case where only the scan rate of the fast axis (in this case, the x-axis) was varied. In another embodiment, the slow scan rate (the y-axis, when the x-axis is the fast axis) can also be varied as well, either separately or in combination with the fast scan axis.

The display of the image data can be accomplished in a number of ways. For example, in FIG. 4, the pixels were plotted versus spatial position. The data could also be plotted versus time, in which case the slow scan regions would be displayed as spatially zoomed.

Figure 6:
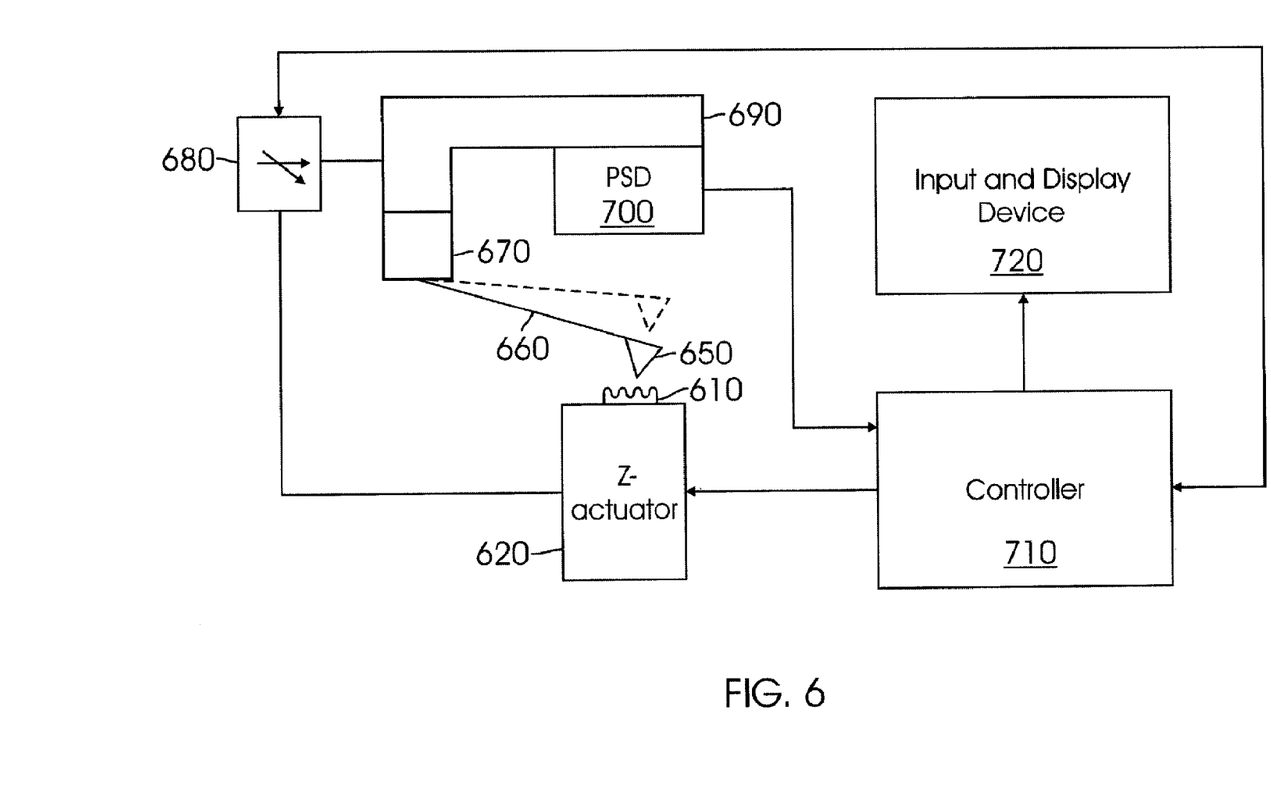
FIG. 6 shows an implementation of a system that may be used to implement variable density scanning, according to some embodiments.

FIG. 6 shows an embodiment of a measurement system incorporating the techniques described above. A sample 610 is attached to a z-actuator 620 ("z" here represents that the actuator moves in the vertical direction) and the base 670 of a flexible cantilever 660 is attached to xy-actuator 680 ("xy" here represents that the actuator moves in the horizontal xy plane) which is attached to a head frame 690 or to the z-actuator 620, such alternative being indicated by lines from the xy-actuator 680 to the head frame 690 and the z-actuator 620 (it being understood that the xy-actuator 680 is attached either at one of these places or the other, but not both). Here, x and y are two non-parallel directions in the horizontal plane (e.g., orthogonal directions in the horizontal plane), while z is a direction not in the xy plane (e.g., the vertical direction orthogonal to the xy plane). The xy-actuator 680, combined with the z-actuator 620, provides relative motion between a probe 650 and the sample 610 in all three dimensions. The cantilever 660 deflects in response to interactions between the probe 650 of the cantilever 660 and the sample 610. This deflection is measured by a PSD 700. The output of the PSD 700 is collected by the controller 710. Typically, the controller 710 performs some processing of the signal, extracting quantities such as the cantilever deflection, amplitude, phase or other parameters. These values are often displayed on a display device 720. Furthermore, the controller 710 can operate a feedback loop that in turn varies the relative position of the base 670 of the cantilever 660 and the sample 610 in response to sample characteristics. For this purpose, the controller 710 sends control signals to the xy-actuator 680 and the z-actuator 620. In one embodiment, the xy-actuator 680 includes a position sensor that allows closed loop feedback positioning control.

An example where the x-axis is the fast scan axis and xy-actuator 680 may implement a scanning waveform having a first substantially linear region with a first slope, and a second substantially linear region with a second different slope, is illustrated in the embodiment depicted in FIG. 3.

In other embodiments, the scan may be performed using a waveform that does not have linear regions. However, it is often useful to have linear regions with different scan rates separated by non-linear transition regions. Transition regions such as these allow the behavior of the scanner to be improved, to reduce ringing and allow closed loop feedback control, the preferable feedback methodology, to work efficiently.

Figure 7:
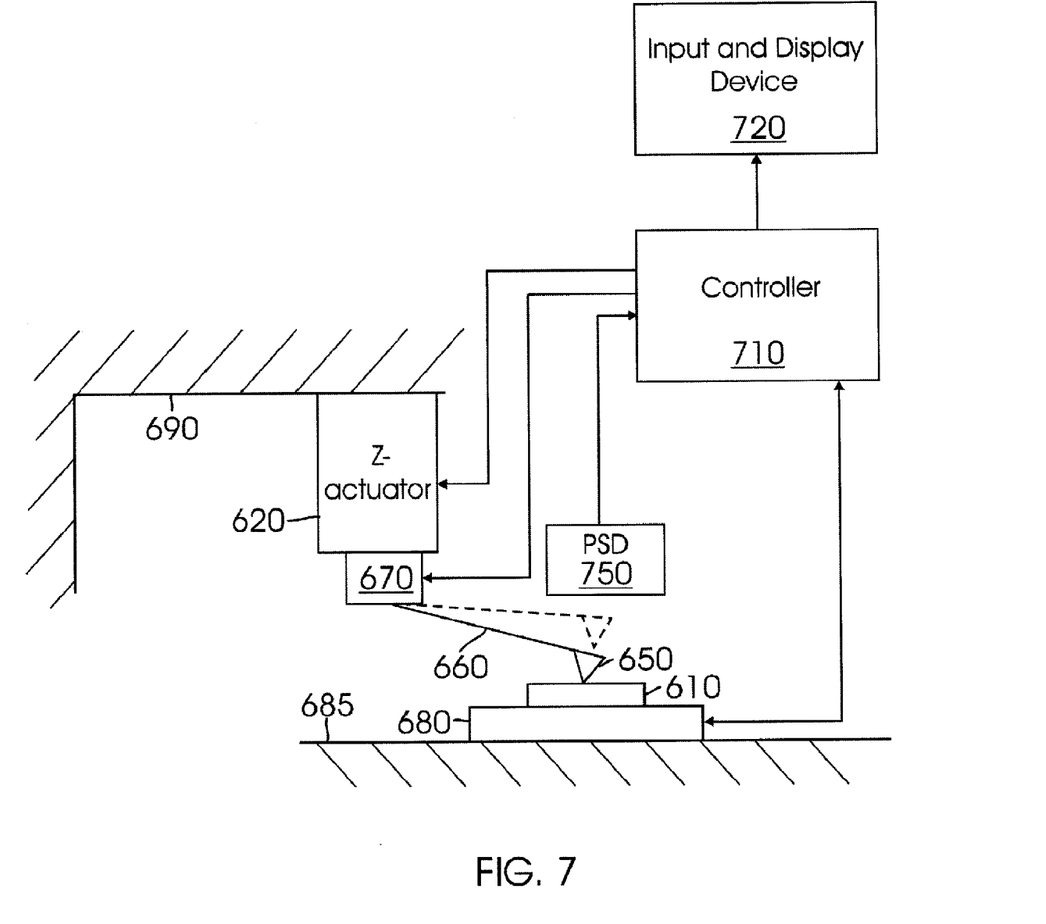
FIG. 7 shows an implementation of a system that may be used to implement variable density scanning, according to some embodiments.

FIG. 7 shows another embodiment of a system that may be used to implement the techniques described above. In FIG. 7, controller 710 is in communication with an xy-actuator 680 to which a sample 610 is attached so that the probe 650 of cantilever 660 is scanned relative to the surface of sample 610 using waveforms such as those described above. The frame of the microscope base 685 could contain other coarse positioning elements such as manual or motorized mechanical translation stages. In this embodiment, the cantilever 660 and its base 670 are actuated in the z-direction by actuator 620 which is in communication with the controller 710. Motion of the cantilever 660 is detected by a detector 750 that can either be fixed relative to the head frame 690 or relative to the cantilever base 670.

In addition to the embodiments described here, there are numerous other instruments that could benefit from the systems and techniques described here. In particular, this includes AFMs configured for larger samples or for industrial measurements such as those described in U.S. Pat. Nos. 6,945,100, 6,677,567, 6,612,160, 6,530,268, 6,032,518, 5,714,682, 5,560,244 and 5,463,897, and in US patent applications 20040079142A1 and 20030209060A1 (which have been incorporated herein by reference).

Although it is advantageous to use closed loop scanners for these metrology measurements, it is not required. In some cases, it may be sufficient and even advantageous to use an arrangement where the performance of an open loop scanner is augmented by the addition of a closed loop scanner capable of performing the scanning waveforms described here. Scanners such as these are currently commercially available under the trade name "npoint" and include the XY scanner with trade name NPXY100A and similar systems.

Figure 8A:
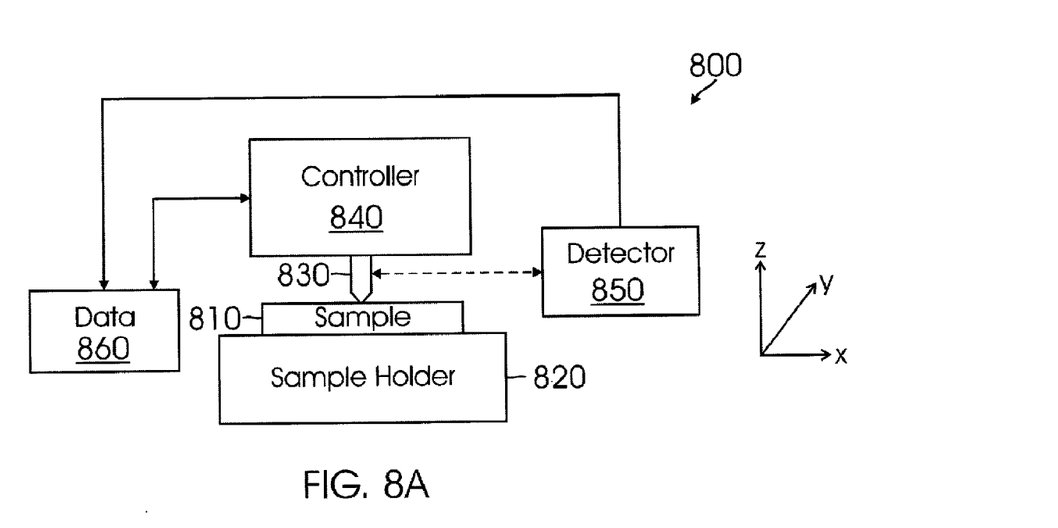
FIGS. 8A and 8B are schematic diagrams of a system that may be used for variable density scanning, according to some embodiments.

FIG. 8A shows an embodiment of a measurement system 800 incorporating the techniques described above. System 800 includes a sample 810 positioned on a sample holder 820. A measurement instrument 830 is configured to obtain information across sample 810. Instrument 830 is scanned across the surface of sample 810 using a controller 840.

Sample data is obtained using a detector 850, which may be a PSD or other detector. Information indicative of one or more sample characteristics (such as topographical characteristics, magnetic characteristics, electrical characteristics, etc.) may be provided to a data storage and/or processing unit 860 (which may comprise a single unit or multiple units, and may be at least partially integrated with other elements of system 800). Processing unit 860 may also include software and/or hardware (as well as other means known to those versed in the art) to make use of data to control scanning of instrument 830, according to the embodiments of the invention provided herein.

For an example where the x-axis is the fast scan axis, processing unit 860 may include data causing controller 840 to implement a waveform having a first substantially linear region with a first slope, and a second substantially linear region with a second different slope, as illustrated in the embodiment illustrated in FIG. 3.

In other embodiments, the scan may be performed using a waveform that does not have linear regions as has been discussed above in connection with the description of the embodiment depicted in FIG. 6.

Figure 8B:
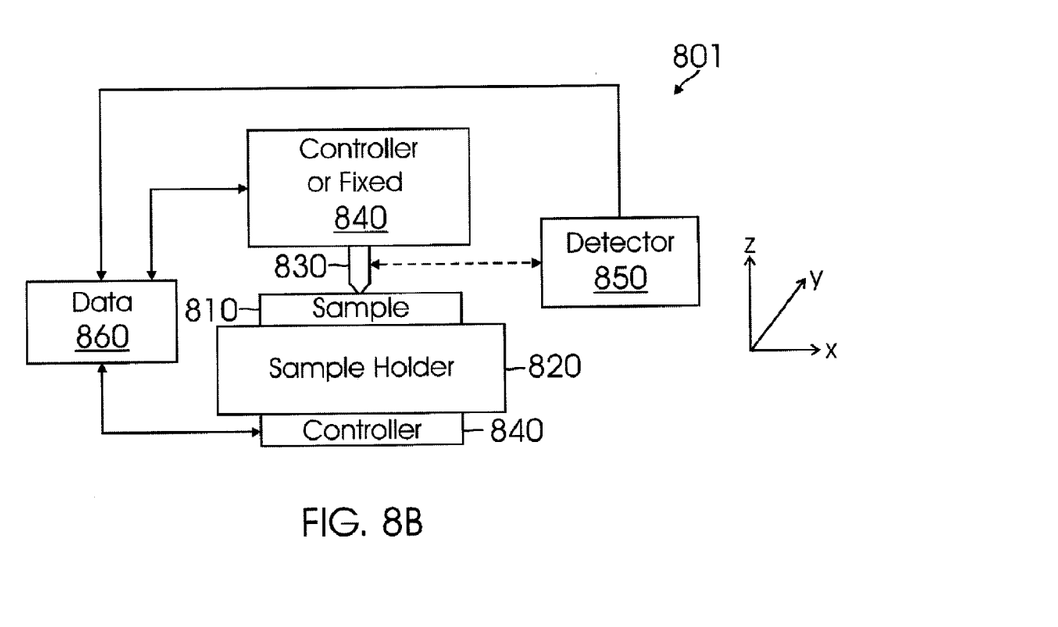

FIG. 8B shows another embodiment of a system 801 that may be used to implement the techniques described above. In FIG. 8B, controller 840 is in communication with sample holder 820, and may control holder 820 so that instrument 830 is scanned across the surface of sample 810 using waveforms such as those described above. Controller 840 (which may be a single unit, may be multiple units, and/or may be at least partially integrated with another part of system 801) may also control instrument 830, if desired. However, control of either instrument 830 or sample holder 820 in the scanning plane may simplify operation of system 801.

The measurements for which the systems and techniques provided herein are potentially useful include a wide variety of metrology applications where precise measurements of small features referenced specifically to nearby larger features are desirable or where, in an automated production process, a particular step is continued until the component tolerances, as measured by the above systems or techniques are deemed to be within specification. Examples include semiconductor and electronic device process controls such as chemo-mechanical polishing (CMP), surface flatness, surface waviness, surface finish quality, planarity, step and feature heights, and height differences (to name a few). In addition to semiconductor manufacturing, there are numerous other fields where this technique could be used including optics, micro-electromechanical (MEMS) devices and data storage devices.

The systems and techniques provided herein can be combined with many other surface measurement and observation instruments. For example, features could be identified with an optical microscope, interferometer, scatterometer, ellipsometer, bright or dark field microscope, Raman microscope or optical profiler. These features could then be registered as regions of interest for inspection with a cantilever-based instrument. The regions of interest could then be linked to high data density image regions in the cantilever-based instrument. This combination could, for example, be used for defect detection or defect review of a semiconductor or other type of wafer where optical techniques are used to identify defects. The systems and techniques provided herein can then be used in conjunction with the optical information to describe a region of interest where high resolution data is useful and where lower resolution data in the neighborhood of the region of interest is also of use. More detailed information on the defect or other feature can then be acquired and displayed according to the above discussion.

This selective region of interest examination technique has obvious applications in the conventional semiconductor industry but also in other manufacturing industries. The dimensions of high brightness LEDs, CMOS and other imaging sensors (cameras), special coatings on glass or other substrates (indium-tin oxide), liquid crystal or other display technologies, SiC and GaN based Shottky diodes and field effect transistors (FETs) are all shrinking, leading to more stringent metrology requirements.

The discussion of systems and techniques herein has focused mainly on the application of these systems and techniques to topography measurements. Cantilever-based instruments are capable of many other types of measurements as well, either independent of or associated with topography measurements. These include DC contact mode imaging and AC modes including phase imaging, force modulation, sample stiffness, magnetic forces and interactions and dissipation, electrical characterization such as tunneling current, conductivity, capacitance, spreading resistance, electric force, Kelvin force, potential, dissipation, and numerous other modes described in the AFM literature.

Extending the systems and techniques provided herein and illustrated with topography examples to these and other additional measurements now conventional with cantilever-based instruments is straightforward. Examples include magnetic force microscopy, dissipation, phase imaging, thermal scanning, magnetic sensitivity mapping, tunneling microscopy, conductive AFM, scanning capacitance, Kelvin force, scanning potential microscopy, scanning electrochemical or ion conductance microscopy and scanning near field optical microscopy. This list is only a partial list of available other modes, any of which could benefit from the systems and techniques described here. A region of interest in one or more of these information channels is very similar to the idea of a region of interest in topography. In some cases, the region of interest might be spatially located at the same physical location, in others it could be offset by some prescribed distance.

The above described techniques and their variations may be implemented at least partially as computer software instructions. Such instructions may be stored on one or more machine-readable storage media or devices and are executed by, e.g., one or more computer processors that cause the measurement instrument to perform the described functions and operations.

A number of implementations have been described. Although only a few implementations have been disclosed in detail above, other modifications are possible, and this disclosure is intended to cover all such modifications, and most particularly, any modification which might be predictable to a person having ordinary skill in the art.

Also, only those claims which use the word "means" are intended to be interpreted under 35 USC 112, sixth paragraph. In the claims, the word "a" or "an" embraces configurations with one or more elements, while the phrase "a single"

embraces configurations with only one element, notwithstanding the use of phrases such as "at least one of" elsewhere in the claims. Moreover, no limitations from the specification are intended to be read into any claims, unless those limitations are expressly included in the claims. Accordingly, other embodiments are within the scope of the following claims.

What is claimed is:

1. A method of controlling a cantilever based scanning instrument that determines information about a surface, comprising:

using the cantilever to characterize and measure information from the surface by driving the cantilever using a dual density data scanning pattern to obtain more data density in a first region of the surface that is scanned by the cantilever, and to obtain less data density in a second region of the surface, where said information about said first and second regions of the surface are obtained from a scan waveform driving the cantilever that drives, the cantilever to obtain more data density for said first region and less data density for said second region during the scan waveform, to obtain an image representing sampled information about the surface which has more data density in said first region and less data density in said second region from said scan waveform; and producing an output showing said sampled information, where said output provides said more data density in said first region and said less data density in said second region.

2. The method as in claim 1, wherein said image shows square pixels outside said first region.

3. The method as in claim 1, wherein said display output shows pixels which have a different size in said first region.

4. The method as in claim 1, wherein said cantilever is driven to scan in a first direction at said first and second scanning speeds by said scan waveform, where said first scanning speed is configured to obtain first data at a first data density in a first region of the sample and said second scanning speed configured to obtain second data at a second data density less than the first data density in a second region of the sample.

5. The method as in claim 1, wherein said cantilever is driven to scan in a first direction and also in a second direction orthogonal to the first direction, at first and second scanning speeds, by said single waveform, where said first scanning speed is configured to obtain first data at a first data density in a first region of the sample and said second scanning speed configured to obtain second data at a second data density less than the first data density in a second region of the sample.

6. The method as in claim 1, wherein said scan waveform includes first and second linear scan segments, and transition regions between said linear scan segments.

7. The method of claim 1, wherein the cantilever based scanning instrument is an atomic force microscope.

8. A cantilever based scanning instrument that determines information about a surface, comprising:

a cantilever;

a controller that controls scanning of the cantilever, said controller driving the cantilever to characterize and measure information from the surface using a scan waveform that drives the cantilever to obtain more data density in a first region of the surface that is scanned by the cantilever, and to obtain less data density in a second region of the surface, and said scan waveform causes the cantilever using a dual data density scanning pattern to obtain more data density for said first region and less data density for said second region during said scan waveform;

said controller obtaining sampled information about the surface which has more data density in said first region and less data density in said second region in said scan waveform; and said controller producing an image showing said sampled information, where said output provides said more data density in said first region and said less data density in said second region.

9. The instrument as in claim 8, wherein said image shows more detail in one area of the surface for a single display obtained from said scan waveform.

10. The instrument as in claim 9, wherein said image shows square pixels outside of said one area of the surface.

11. The instrument as in claim 9, wherein said image shows pixels which have a different size in said one area of the surface than in other areas of the surface.

12. The instrument as in claim 8, wherein said controller causes said cantilever to scan in a first direction at said first and second scanning speeds based on said scan waveform, where said first scanning speed is configured to obtain first data at a first data density in a first region of the sample and said second scanning speed configured to obtain second data at a second data density less than the first data density in a second region of the sample.

13. The instrument as in claim 8, wherein said controller causes said cantilever to scan in a first direction and also in a second direction orthogonal to the first direction, at first and second scanning speeds based on said scan waveform, where said first scanning speed is configured to obtain first data at a first data density in a first region of the sample and said second scanning speed configured to obtain second data at a second data density less than the first data density in a second region of the sample.

14. The instrument as in claim 8, wherein said scan waveform includes first and second linear scan segments, and transition regions between said linear scan segments.

15. The instrument of claim 8, wherein the cantilever based scanning instrument is an atomic force microscope.

16. An article comprising a non-transitory machine-readable medium embodying information indicative of instructions that when performed by one or more machines result in computer implemented operations comprising:

using a cantilever to characterize and measure information from a surface being measured by driving the cantilever using a scan waveform to obtain more data density in a first region of the surface that is scanned by the cantilever using a dual data density scanning pattern, and to obtain less data density in a second region of the surface, where said information about said first and second regions of the surface are obtained from said scan waveform, and said scan waveform drives the cantilever to obtain more data density for said first region and less data density for said second region; to obtain sampled information about the surface which has more data density in said first region and less data density in said second region; and producing an output image showing said sampled information, where said output image shows said more data density in said first region and said less data density in said second region.

17. The article as in claim 16, wherein said output image shows square pixels outside of said one area of the surface.

18. The article as in claim 16, wherein said output image shows pixels which have a different size in said one area of the surface than in other areas of the surface.

19. The article as in claim 16, wherein said cantilever scans in a first direction at said first and second scanning speeds based on said scan waveform, where said first scanning speed is configured to obtain first data at a first data density in a first region of the sample and said second scanning speed configured to obtain second data at a second data density less than the first data density in a second region of the sample.

20. The article as in claim 16, wherein said cantilever scans in a first direction and also in a second direction orthogonal to the first direction based on said scan waveform, at first and second scanning speed, where said first scanning speed is configured to obtain first data at a first data density in a first region of the sample and said second scanning speed configured to obtain second data at a second data density less than the first data density in a second region of the sample.

21. The article as in claim 16, wherein said scan waveform includes first and second linear scan segments, and transition regions between said first and second linear scan segments.

22. The article of claim 16, wherein the cantilever based scanning instrument is an atomic force microscope.

\* \* \* \* \*